(12) United States Patent
Krausz et al.

(10) Patent No.: US 7,837,238 B2
(45) Date of Patent: Nov. 23, 2010

(54) PIPE GRIP RING

(75) Inventors: Eliezer Krausz, Tel-Aviv (IL); Avi Chiproot, Kfar-Saba (IL)

(73) Assignee: Krausz Industries Development Ltd, Tel Aviv (IL)

( * ) Notice: Subject to any disclaimer, the term of this patent is extended or adjusted under 35 U.S.C. 154(b) by 0 days.

(21) Appl. No.: 12/352,174

(22) Filed: Jan. 12, 2009

(65) Prior Publication Data

US 2010/0176588 A1 Jul. 15, 2010

(51) Int. Cl.
*F16L 35/00* (2006.01)

(52) U.S. Cl. .................... 285/421; 285/323; 285/343

(58) Field of Classification Search .............. 285/323, 285/343, 421
See application file for complete search history.

(56) References Cited

U.S. PATENT DOCUMENTS

| 2,755,109 | A | * | 7/1956 | Risley | 285/232 |
| 4,070,046 | A | * | 1/1978 | Felker et al. | 285/323 |
| 4,119,335 | A | * | 10/1978 | Rieffle et al. | 285/323 |
| 5,188,401 | A | * | 2/1993 | Staniforth | 285/322 |
| 5,335,946 | A | | 8/1994 | Dent et al. | |
| 6,106,029 | A | * | 8/2000 | DeMore et al. | 285/322 |
| 6,257,628 | B1 | * | 7/2001 | Nijsen | 285/323 |
| 6,517,122 | B1 | | 2/2003 | Minemyer | |
| 6,533,331 | B2 | * | 3/2003 | Hulsebos et al. | 285/323 |
| 6,843,514 | B2 | * | 1/2005 | Rex et al. | 285/323 |
| 6,851,728 | B2 | * | 2/2005 | Minami | 285/323 |
| 7,255,373 | B2 | * | 8/2007 | Pridham | 285/332.1 |
| 7,571,940 | B2 | * | 8/2009 | Krausz et al. | 285/323 |

FOREIGN PATENT DOCUMENTS

| EP | 1380788 | 1/2004 |
| EP | 1760379 | 3/2007 |
| JP | 03084293 | 4/1991 |
| WO | WO03010461 | 2/2003 |

* cited by examiner

*Primary Examiner*—David E Bochna
(74) *Attorney, Agent, or Firm*—Dekel Patent Ltd.; David Klein

(57) ABSTRACT

A grip element comprising a wedge-like structure supporting a metal plate, the exposed outer surface thereof being provided with an array of large and small gripping teeth. The large teeth project from the surface of said metal plate further than said small teeth. The invention further provides a grip element having a floor. The grip elements may be disposed around a ring for the purpose of pipe gripping. The ring is particularly useful in a pipe coupling to grip metal and plastic pipes.

3 Claims, 2 Drawing Sheets

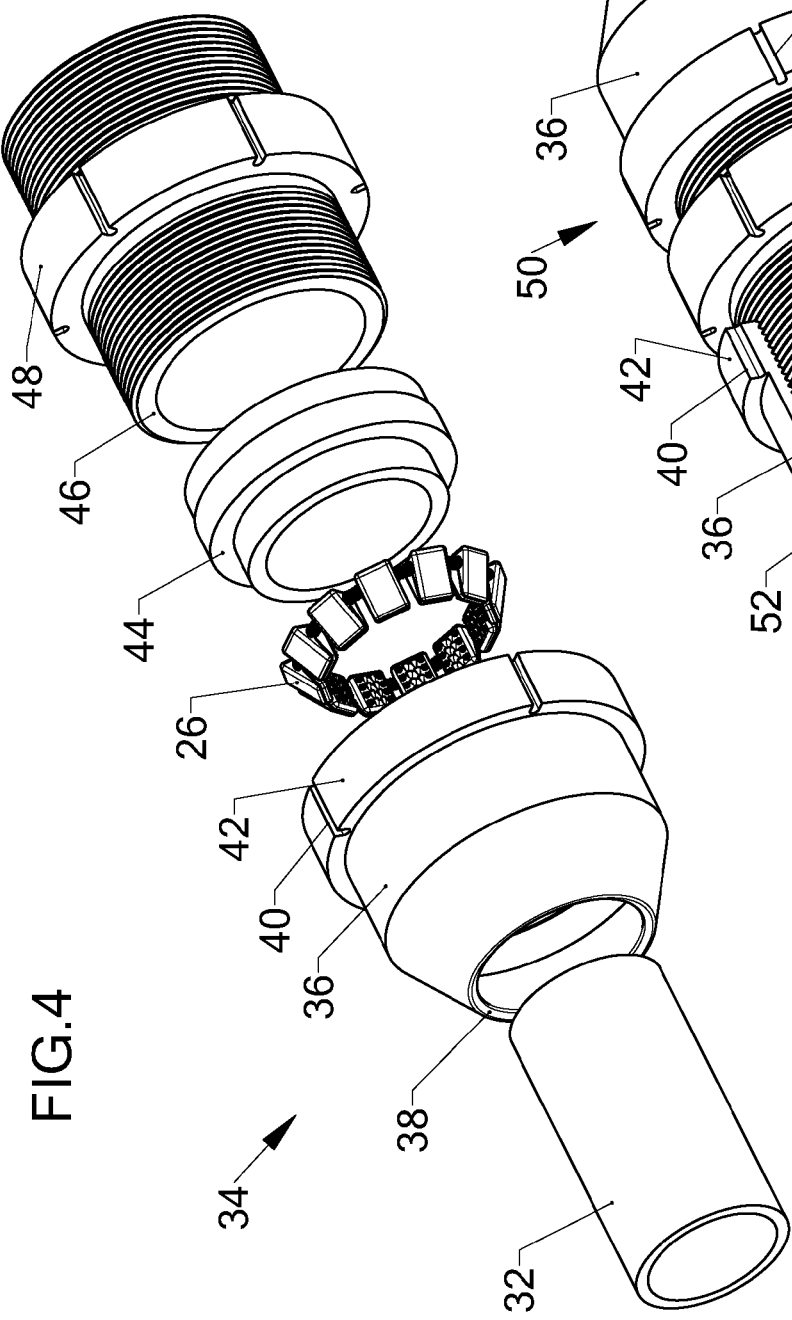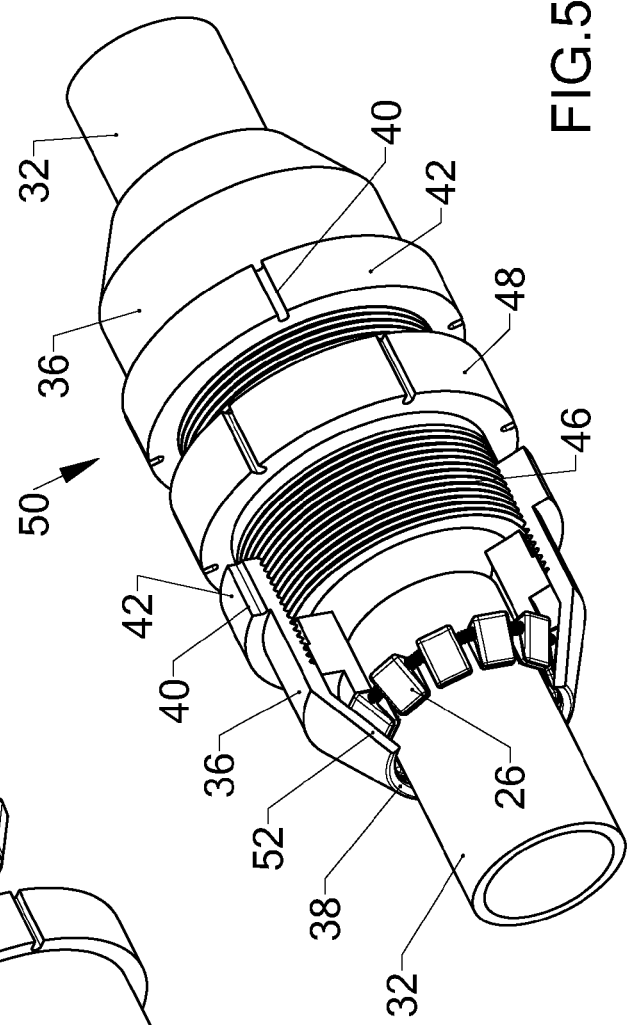

PIPE GRIP RING

FIELD OF INVENTION

The present invention relates to a gripper element particularly useful for pipe line fittings. More particularly, the invention provides a grip element which can be used in pipe line fittings and couplings, for griping plastic or metal pipes, or any other material.

BACKGROUND OF THE INVENTION

While in the past all piping was made of metal, usually metal, today plastic piping is in widespread use and has been found suitable for many applications. Plastic pipes are widely used for the protection of electric cables, sewage, drainage and, where the pipe diameter is small for water under pressure. Larger sizes of plastic piping are suitable for conditions where there is little or no internal pressure, and in applications not exposed to solar radiation. The present invention relates particularly to intermediate size piping, typically the 50 to 200 mm range. Many prior art designs are suitable for pipes under about 5o mm, while the over 200 range is served well by band clamps. The present invention refers to a gripper foot where the same clamp can be usefully applied to fittings carrying metal or plastic pipes.

As far as the present invention is concerned it should be noted that not only are metals harder than plastics, but also metals have a Young's Modulus about 10 times higher than plastics. Thus if a pointed tool is pressed onto the outside of a plastic pipe the tool will penetrate deeper and distort the pipe to a much greater degree than if the same tool and force was applied to a steel pipe having the same dimensions. Thus a prior art pipe coupling for example suitable for a 3" steel pipe will be unsuitable for a 3" pipe of the same wall thickness when made of a plastic.

These considerations are extended also to applications such as material feeding as part of a manufacturing process. The grip unit is useful for feeding sheet material to a press which is used sometimes for manufacturing metal articles and at other times for manufacturing articles made from materials other than metals.

The following brief review of recent U.S. patents provides an assessment of the state of the art.

In U.S. Pat. No. 6,019,396 Saito et al. disclose a pipe coupling having a retainer member which is axially compressible to resist an axial force separating the pipes. Due to a complex outer shape two different degrees of compression are available, in order to handle both plastic and steel pipes. However there is some doubt regarding retention of steel pipes as the retainer member does not penetrate the outer skin of the pipe.

DeMore et al. claim in U.S. Pat. No. 6,106,029 that their design of pipe coupling has improved pull-out resistance for plastic and for steel pipes. The lock ring used requires several arcuately-spaced slots for slideably supporting individual gripper segments, which are claimed to effect a penetrating restraining grip against the pipe end. As said gripper makes line contact with a steel pipe very high pressure would be required to penetrate the pipe surface.

A similar disadvantage is present in the coupling disclosed by Hulsechos et al. in U.S. Pat. No. 6,481,755. Some increase in holding power is provided by dents pressed into the grip ring, which is a complex and costly structure.

The complex pipe coupling disclosed by Robinson, Jr. in U.S. Pat. No. 6,565,125 features the well-known axial-movement conical lock. The design includes a bolt having an axis tangential to the pipes being held in the coupling intended to limit the force applied by the clamp collar. The bolt thus requires adjustment when set to a hard material while a soft material is being gripped and also when set to a soft material pipe while a hard material is being gripped. The risk is high that during installation the bolt will be wrongly adjusted.

Isenam et al. propose a high grip coupling in US Patent Application No. 2002/0101080. This design requires machining and swaging one of the pipe ends, which is impractical in the field and even in the factory is difficult for long pipes.

OBJECTS OF THE INVENTION

In view of this state of the art it is now one of the objects of the present invention to obviate the disadvantages of prior art gripping devices and to provide a device which is suitable for gripping both metal and plastic items.

It is a further object of the present invention to provide a pipe fitting, particularly a pipe coupling having improved pull-out resistance, utilizing a plurality of the grip elements described in the present disclosure.

Yet a further object is to provide a pipe coupling which is suitable without adjustments for both metal and plastic piping.

SUMMARY OF THE INVENTION

The present invention achieves the above objects by providing a grip element comprising a wedge-like structure supporting a metal plate, the exposed outer surface thereof being provided with an array of large and small gripping teeth, said large teeth projecting from the surface of said metal plate further than said small teeth.

In a preferred embodiment of the present invention there is provided a grip ring for a pipe, said grip ring comprising an outer ring retaining several spaced-apart grip elements distributed around the inner circumference of said grip ring, the teeth of said grip element facing inwards towards the center of said ring, and wherein the wall of said grip ring lies in a conical plane.

In a most preferred embodiment of the present invention there is provided pipe fitting comprising an outer body, a grip ring as described in the previous paragraph and clamping means associated with said outer body for pressing said grip ring against the surface of a metal or plastic pipe.

In another preferred embodiment of the present invention there is provided a pipe fitting being a pipe coupling provided with two axially spaced-apart clamp grip rings.

It will thus be realized that the novel grip element of the present invention can be used in contact with either metal or plastic pipes without requiring any adjustment. The array of larger teeth will penetrate the surface of a plastic pipe to a depth sufficient to prevent axial withdrawal. The smaller and thus stronger teeth will penetrate the surface of a metal pipe even if the larger teeth collapse.

The grip element is manufactured out of a medium-hardness steel alloy by use of one or more press tools.

The grip element is suitable for use in further applications.

The grip ring described can be used in combination with various pipe fittings.

The most important application of the grip ring as seen now is in a pipe coupling for intermediate pipe diameters, where it is expected that the pipes will be subject to axial forces which may arise in service. Such forces may originate from thermal contraction, from bending of the pipe or from internal fluid pressure.

The invention will now be described further with reference to the accompanying drawings, which represent by example preferred embodiments of the invention. Structural details are shown only as far as necessary for a fundamental understanding thereof. The described examples, together with the drawings, will make apparent to those skilled in the art how further forms of the invention may be realized.

BRIEF DESCRIPTION OF THE DRAWINGS

FIG. 4 is an exploded view of a pipe fitting including the grip ring seen in the previous figure; and FIG. 5 is a perspective view of a pipe coupling wherein one of the cone nuts has been sectioned to reveal one of the grip rings.

DETAILED DESCRIPTION OF PREFERRED EXEMPLARY EMBODIMENTS

Figure 1:
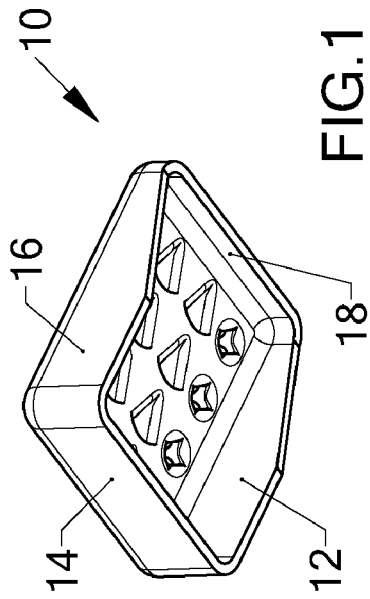
FIG. 1 is a perspective view of a preferred embodiment of the grip element seen from underneath, according to the invention.
Figure 2:
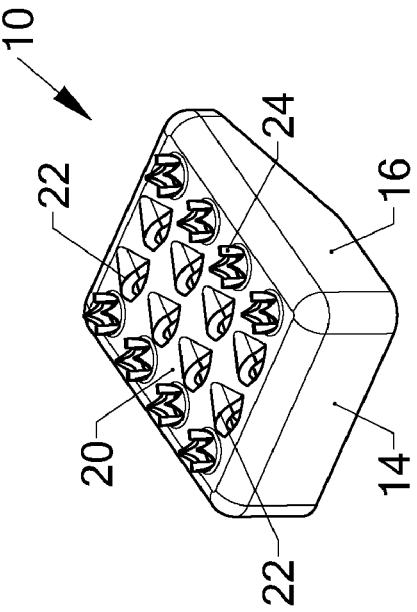
FIG. 2 is a perspective view of the same embodiment seen from above.

There is seen in FIGS. 1 and 2 a grip element 10 made of sheet steel. FIG. 1 shows the insides of the grip element where all walls 12, 14 16 18 of the element are seen. In FIG. 2 the array of teeth of two different sizes is seen. The angled side walls 12, 16 convert the element 10 into a wedge-like structure. The exposed top outer surface 20 is a steel plate which is integral to all four walls.

The grip element 10 is provided with an array of large 22 and small 24 gripping teeth. The sharp edges of all teeth 22, 24 face the higher 14 of the two end walls, with the large teeth 22 projecting from the surface of the top outer surface 20 further than do the small teeth 24.

With reference to the rest of the figures, similar reference numerals have been used to identify similar parts.

Figure 3:
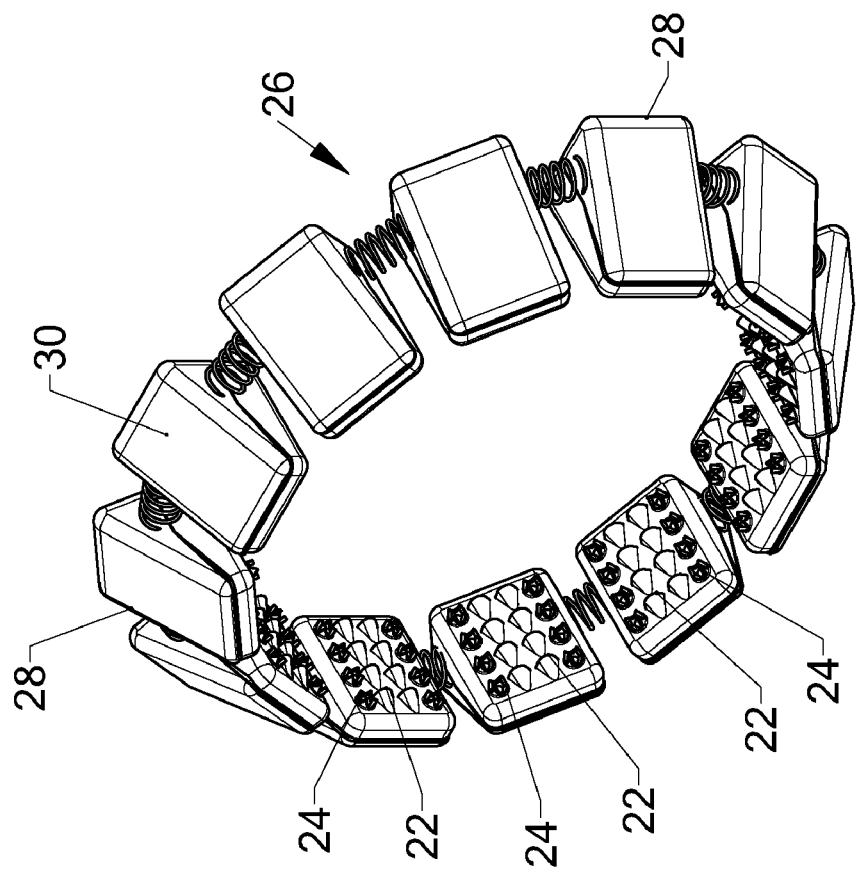
FIG. 3 is a perspective view of a grip ring carrying multiple grip elements.

FIG. 3 illustrates a grip ring 26, for use in a pipe fitting to be described with reference to FIG. 4. The ring 26 retains several spaced-apart grip elements 28 which are radially evenly distributed around the circumference of the grip ring. The grip elements 28 are identical to the grip elements 10 described with reference to FIGS. 1 and 2, except that a floor closure 30 is provided.

All the teeth 22, 24 of the grip element face inwards towards the center of the ring 26. The toothed surfaces 20 together form an internal surface which is parallel to the pipe surface 32 and of a diameter very slightly larger than the pipe diameter seen in FIG. 4. The floor surfaces 30 of the grip elements 28 in combination form a section of a slice of a cone cut parallel to the cone base.

One of the advantages of the floor 30 is that the structure of the grip elements 28 is strengthened thereby. Furthermore the floor 30 which is subjected to a high compressive force when in use is better able to slide along the conical face 52 seen in FIG. 5 where it is found on the inside of the conical nut housing 36. Consequently less torque is required to tighten the conical nut housing 36.

Turning now to FIG. 4 there is seen an externally screwed portion of a pipe retention device 34 for a pipe fitting such as a valve, tap, pipe junction, filter, fluid meter and the like. A conical nut housing 36 has a central aperture 38 slightly larger than the pipe 32 to be held therein. Wrench slots 40 for tightening the nut housing 36 are provided on an outer surface 42. The grip ring 26 seen in FIG. 3 will be inserted over the pipe 32 after this pipe is inserted into aperture 38. An elastomer gasket 44 is also slid over the pipe 32. The conical nut housing 36 is then tightened on to a threaded hollow component 46 where it can be secured by a lock nut 48.

As the conical nut housing 36 is tightened the elastomer gasket 44 is compressed to seal the space between the threaded hollow component 46 and the conical nut housing 36. At the same time the conical nut housing 36 applies pressure to the grip ring 26 and causes the teeth 22, 24 to penetrate the outer diameter of the pipe 32.

Referring now to FIG. 5, there is depicted a pipe fitting being a pipe coupling 50 provided with two axially spaced-apart clamp grip rings 26, only one of which is visible in the figure. The components 26, 36, 38. 40, 42, 46 and 48 are the same as those seen in the previous figure.

The scope of the described invention is intended to include all embodiments coming within the meaning of the following claims. The foregoing examples illustrate useful forms of the invention, but are not to be considered as limiting its scope, as those skilled in the art will readily be aware that additional variants and modifications of the invention can be formulated without departing from the meaning of the following claims.

We claim:

1. A grip ring for a pipe comprising:
a plurality of grip elements radially spaced from one another to form a ring, each grip element comprising a plate from which extend side walls, said plate and said side walls forming a wedge, an exposed outer surface of said plate being provided with an array of large and small gripping teeth, said large teeth projecting from the outer surface of said plate further than said small teeth; and
a plurality of individual flexible elements affixed to side portions of adjacent grip elements;
wherein the teeth of said grip elements face inwards towards a center of said ring, and wherein surfaces of said grip elements opposite said teeth lie in a conical plane, wherein said flexible elements comprise springs.

2. A pipe fitting comprising an outer body, a grip ring as claimed in claim 1 and clamping means associated with said outer body for pressing said grip ring against the surface of a pipe.

3. The pipe fitting according to claim 2, said fitting being a pipe coupling provided with two axially spaced-apart clamp grip rings.

* * * * *